United States Patent [19]

Mazuch et al.

[11] Patent Number: 5,024,702

[45] Date of Patent: Jun. 18, 1991

[54] SOIL OR AGGREGATE STABILIZING AGENT AND MATRIXES STABILIZED BY SAME

[76] Inventors: Ludvik Mazuch, 767 Walsred Road, Victoria, British Columbia, Canada, V9C 2X3; David R. Haughton, 2760 Dooley Road, Victoria, British Columbia, Canada, V8Y 1R7

[21] Appl. No.: 309,602

[22] Filed: Feb. 9, 1989

Related U.S. Application Data

[63] Continuation-in-part of Ser. No. 177,825, Mar. 24, 1988, abandoned, which is a continuation of Ser. No. 853,563, Apr. 18, 1986, abandoned.

[30] Foreign Application Priority Data

Jun. 26, 1985 [CA] Canada .................................. 485445

[51] Int. Cl.$^5$ ............................................. C08L 95/00
[52] U.S. Cl. .................................. 106/277; 106/273.1; 106/123.1
[58] Field of Search .................. 106/277, 273.1, 123.1

[56] References Cited

U.S. PATENT DOCUMENTS

| | | | |
|---|---|---|---|
| 3,859,227 | 1/1975 | Dwyer | 106/277 |
| 4,017,419 | 4/1977 | Ludwig et al. | 106/277 |
| 4,293,459 | 10/1981 | Detroit | 106/277 |
| 4,427,449 | 1/1984 | Zdybak | 106/277 |

FOREIGN PATENT DOCUMENTS 590322 2/1978 U.S.S.R. .

OTHER PUBLICATIONS

"Stabilization of Sandy Gravels Using an Asphalt Emulsion and Lignosulfonate as a Binder", by L. Mazuch, D. R. Haughton and O. R. Tisot, published *Canadian Technical Asphalt Association Proceedings*, vol. XXXI, Nov. 1986.

*Primary Examiner*—Mark L. Bell
*Assistant Examiner*—Helene Klemanski
*Attorney, Agent, or Firm*—Klarquist, Sparkman, Campbell, Leigh & Whinston

[57] ABSTRACT

A soil or aggregate stabilizing agent is formed by mixing asphaltic emulsion, lignosulfonate and water. The agent is considered useful in a variety of applications, particularly road construction.

14 Claims, No Drawings

SOIL OR AGGREGATE STABILIZING AGENT AND MATRIXES STABILIZED BY SAME

This application is a continuation-in-part of application No. 177,825 filed on Mar. 24, 1988, now abandoned which is a continuation of application No. 853,563 filed on Apr. 18, 1986, now abandoned.

FIELD OF THE INVENTION

This invention relates to soil or aggregate stabilization. More particularly, this invention relates to a new stabilizing agent useful in a variety of applications, one important area of application residing in the stabilization of the base or sub-base of roads. (Herein, it is to be understood that the term "roads" is not limited to roadways, highways or the like which are typically designed to carry car and truck traffic, but includes structures generally which are designed to carry vehicular traffic; for example, parking lots, airport runways, tarmacs and the like).

BACKGROUND TO THE INVENTION

Base, sub-base and subgrade aggregate used in road construction projects is often not available in a gradation or quality which meets specifications or which has the desired physical characteristics. Also, some soils or aggregates which meet specification may require beneficiation to provide additional strength. The improvement of strength and other physical characteristics of construction soils or aggregates may be achieved by stabilizing the material.

Examples of known soil or aggregate stabilizing agents include lime and fly-ash mixtures, portland cement, asphalt, asphaltic emulsion, and lignosulfonates. However, although there are applications where satisfactory results may be achieved with the use of such agents, their use may be expensive and may be limited depending upon aggregate characteristics. For example, while asphaltic emulsion is a desirable flexible waterproofing agent, is can be difficult to mix into high fines aggregate. Similarly, while lignosulfonate such as calcium lignosulfonate is relatively inexpensive and has dispersive properties, it is brittle and water soluble upon solidification.

Ideally, a soil or aggregate stabilizing agent should not only provide cementatious properties to the soil or aggregate/stabilizer mixture, but should also impart some waterproofing or hydrophobic characteristics to the treated soil or aggregate. In addition, the agent should be inexpensive and easy to apply.

Accordingly, it is an object of the present invention to provide a new and improved agent for stabilizing soils or aggregates, including soils or aggregates such as those used in road or similar construction.

A further object of the present invention is to provide a stabilizing agent that retains the desirable properties, while avoiding or minimizing the undesirable properties, of know stabilizing agents such as those identified above.

A still further object of the present invention is to provide a stabilizing agent that may be easily prepared and applied in the construction of roads.

SUMMARY OF THE INVENTION

In accordance with a broad aspect of the present invention, there is provided an improved stabilizing agent comprising a mixed blend of water, asphaltic emulsion and lignosulfonate. The blend includes at least 10 volume parts of lignosulfonate for each 90 volume parts of asphaltic emulsion. While the emulsion and lignosulfonate components of such blend have each been independently recognized as stabilizing agents, their combination in accordance with the present invention has not—and it has been found that their blended mixture produces a synergistic result highlighting desirable properties and diminishing undesirable properties of the components.

As is described in more detail hereinafter, a suitable lignosulfonate which is relatively inexpensive and which tends to be available in quantity is calcium lignosulfonate. However, other lignosulfonates may be used, the lignosulfonate being selected such that the lignosulfonate and emulsion mixed with water forms a substantially uniform and stable blend. Preferably, there should be little or no coagulation and flocculation of asphaltic particles. Other lignosulfonates that may be used include sodium lignosulfonate and ammonium lignosulfonate.

Commonly available asphaltic emulsion (comprising asphalt with surfactant to suspend particles of asphalt in water) typically varies from supplier to supplier because the surfactant and asphalt composition used will vary from supplier to supplier. In conjunction with the present invention, and although not mandatory, it is considered preferable to use an emulusion which is relatively slow setting. Otherwise, the asphalt may separate from the blend at an excessively rapid rate, thereby inhibiting a thorough mixture with the soil or aggregate.

It has been found that the stabilizing agent of the present invention has desirable low viscosity and waterproofing or hydrophobic characteristics. A strong, hard and flexible surface, stabilizing a wide range of granular base materials including otherwise difficult to stabilize fine to medium size sands, can be economically produced. Such surface may be left unsealed for several weeks, but may be sealed if conditions warrant.

An exemplary area of application for the present invention is in the construction of low maintenance, unpaved secondary roads used for car and truck traffic. Also the present invention may be utilized as a cut-off blanket at the top of a subgrade or other parts of a pavement prism. Further, since the blended mixture of asphaltic emulsion and lignosulfonate acts to depress the freezing point of water, the present invention has the potential to reduce the frost susceptibility of high fines road construction aggregate.

In broader terms, the present invention will have general application in stabilizing soils or aggregates during construction. In addition to its application in road construction, the present invention may be used to protect slopes from wind and rain erosion, as a lining for water channels or for lagoons, basins or reservoirs in combination with other sealants or membranes. Similarly, the present invention may be utilized for lining solution pits and the like.

In all cases, the stabilizing agent of the present invention is mixed throughout a soil or aggregate matrix and, upon setting, stabilizes the matrix.

DETAILED DESCRIPTION

The mechanics of how a blended mixture of water, asphaltic emulsion and lignosulfonate interact with each other and with road construction soil or aggregate to produce the desirable stabilizing properties which are achieved is not fully understood. However, although such mechanics are not considered necessary to an understanding of the invention, it is believed that a particle dispersion process tends to occur when the lignosulfonate, forming a blend with the asphaltic emulsion, is mixed with the soil or aggregate. It is believed that the blend may effectively apply a charge to particles of the soil or aggregate thereby encouraging such particles to repel one another and better enabling the blend to work through and coat the entire soil or aggregate mass. Asphaltic emulsion alone may provide the desirable properties of asphalt, but without such coating throughout. In this respect, the lignosulfonate may be considered as a dispersion agent. As well, it is believed that the lignosulfonate may provide a cementatious action, particularly with low fine particles. Upon setting or hardening, it is believed that the lignosulfonate may solidify and interlock within the soil or aggregate matrix to hold particles together.

The water component of the stabilizer is designed to improve compatibility between the asphaltic emulsion and lignosulfonate by desensitizing the stabilizer to the difference in pH between the emulsion and the lignosulfonate and to prevent coalescence of asphaltic particles. In this regard, it will be recalled that there should preferably be no particle coagulation and flocculation when the emulsion and lignosulfonate are mixed. A uniform blend should form. The water component should accommodate an easy distribution and mixing of the stabilizer with the soil or aggregate.

From application to application, the amount of water added and the relative proportions of emulsion and lignosulfonate will be readily determinable, depending upon the desired properties of the stabilized aggregate, the gradation of the aggregate, the desired depth of penetration of the stabilizer, and the type of the emulsion and lignosulfonate being used.

If one begins with a selected lignosulfonate, then, before any large scale implementation occurs, it should be verified that compatible asphaltic emulsion is available. The pH of the emulsion should be reasonably close to that of the lignosulfonate, otherwise satisfactory results may not be achieved. Good practice will normally dictate the preparation of a test mixture of the emulsion and lignosulfonate with water to verify that a stable blend will form. The same is true if one begins with a given asphaltic emulsion.

It has been found that a volume ratio of lignosulfonate to asphaltic emulsion of about 50:50 takes significant advantage of the stabilizing properties of the invention without material impairment of the properties of asphalt.

In a test case where a 12 km stretch of roadway was stabilized by mixing water, asphaltic emulsion and calcium lignosulfonate in a 1:1:1 volume ratio, it was confirmed that a wide range of granular base materials may be stabilized—including more difficult to stabilize fine to medium size sands. The asphaltic emulsion used was SS-1 anionic emulsion having a pH between 8.5 and 9.5. The lignosulfonate used had a pH between 5.5 and 7.5 ("SS-1" is a known trade designation for a slow setting emulsion).

It was found that the roadway did not have to be sealed right away. In fact, it provided a flexible, hard surface that could be left open for several weeks exposed to traffic. The following desirable properties were noted:

(a) improved compaction and decreased optimum moisture content;
(b) improved dispersion of fines;
(c) increased cohesion among aggregate particles;
(d) reduction in the porosity of aggregate;
(e) encapsulation and waterproofing of aggregate particles.

The road stabilizing agent of the present invention is easy to apply. Various techniques may be implemented utilizing conventional road construction manpower and equipment. The stabilizer may be mechanically mixed with road construction aggregate, either in situ or at a remote site. In the former case, the stabilizer may first be sprayed over the surface of base soil or aggregate defining a road track. This step is followed by several passes of a grader to uniformly spread and thoroughly mix the stabilizer with the soil or aggregate, the objective being to achieve a good, uniform distribution throughout. Then, before setting occurs, the road track is compacted. Other mechanical devices (for example, conventional rotovating devices) may also be used to mix the stabilizer with the aggregate.

In the latter case where mixing of the stabilizer and soil or aggregate is performed at a remote site, the base, now premixed with unset stabilizer, is trucked to and spread along the road track where it is compacted before setting occurs. This procedure may be considered preferable for larger construction projects served from a centralized remote site. The former procedure may be considered preferable for small jobs.

In order to better demonstrate the improved results achieved by the present invention, and to show that its benefits are not restricted to a volume ratio of 50:50 between asphaltic emulsion and lignosulfonate, a set of thirteen stabilized aggregate samples was prepared and tested, all but two of the samples using a mixed blend of asphaltic emulsion, calcium lignosulfonate and water as the stabilizing agent. The two exceptions were:

(a) the first sample which used asphaltic emulsion and water, but no lignosulfonate, as the stabilizer;
(b) the last sample which used lignosulfonate and water, but no asphaltic emulsion, as the stabilizer;

The remaining eleven samples included varying proportions of asphaltic emulsion and calcium lignosulfonate, and included one sample where the volume ratio of asphaltic emulsion, lignosulfonate and water was 1:1:1.

The results of the testing and related calculations are summarized in TABLE 1 entitled "Different Ratios of Asphaltic Emulsion and Lignosulfonate". This table is divided into five sections and thirteen columns, each column pertaining to one of the thirteen samples.

The testing was done in accordance with ASTM 1559 of the American Society for Testing and Materials; ASTM 1559 being an industry accepted standard covering the measurement of the resistance to plastic flow of cylindrical specimens of bituminous paving mixtures when loaded on their lateral surface by means of Marshall apparatus.

The samples were made using a sandy aggregate typical of that to be found in the field, but which (by reason of its sandiness) is ordinarily difficult to stabilize. A 'hard case' was deliberately self-imposed, the purpose being to demonstrate the utility of the invention even with sandy material. The aggregate had a profile as indicated by the sieve analysis results summarized in TABLE 2.

Referring now in more detail to TABLE 1, Section A shows the ratio of the parts by volume of asphaltic emulsion to lignosulfonate and to water ranging from 100:0:50 (Sample 1—no lignosulfonate) to 0:100:50

(Sample 13—no asphaltic emulsion). A ratio of 50:50:50 (1:1:1) appears at mid-range (Sample 7). In each case, where a mixture of asphaltic emulsion and calcium lignosulfonate was present, it was found that the blended mixture was stable and compatible.

Section B of TABLE 1 is a series of residue by weight figures which were calculated from the volume ratios in Section A (also utilizing the residue and density figures which appear in the note at the bottom of the table).

Section C, line 1, of TABLE 1 shows measured Marshall load values (expressed in Newtons) for each of the thirteen samples. In line 2 of this section, these values are expressed in terms of the relative percentage increased in Marshall load for increasing lignosulfonate.

Section D, line 1, of TABLE 1 shows calculated load bearing capacities (expressed in pounds per square inch) for each of the thirteen samples. In line 2 of this section, these values are expressed in terms of the relative percentage increased in load bearing capacity for increasing lignosulfonate.

By way of background, it may be noted that the Marshall load is a representation of resistance to deformation under stress. Essentially, it is a one-time phenomena. In contrast, load bearing capacity is a representation of strength and flexibility under flexion, or how the pavement may perform under the continuing up and down motion of traffic.

Section E of TABLE 1 shows how the cost per kilogram of the residue decreases as the amount of lignosulfonate increases for each of the thirteen samples.

From the data in TABLE 1, it will be observed that from 0 to 10 parts by volume of lignosulfonate relative to asphaltic emulsion there is an increase in both Marshall load and load bearing capacity. However, the increase in Marshall load is relatively slight compared to the increase which occurs from 10 to 20 volume parts of lignosulfonate. In contrast, in the range from 10 to 20 volume parts of lignosulfonate, the increase in both Marshall load and load bearing capacity is substantial.

Thus, at about 10 volume parts of lignosulfonate, there begins a relatively rapid improvement in Marshall load and load bearing capacity. This improvement tends to plateau after about 30 volume parts of lignosulfonate, but would not be expected if there was no interaction between constituents and the results governed merely by the sum of the parts. In the case of load bearing capacity, the data reveals that there is not only an initial rapid improvement, but also that there is a sustained improvement except at the end point of 100 volume parts of lignosulfonate.

The improvement in load bearing capacity is almost as much (238%) at a 50:50 ratio of asphaltic emulsion and lignosulfonate as it is for pure lignosulfonate (257%). Indeed, in the range from 50:50 to pure lignosulfonate there are calculated values of load bearing capacity which exceed that for asphaltic emulsion alone or calcium lignosulfonate alone.

Taking the case of Sample 7 (50:50:50 or 1:1:1) in TABLE 1, it will be seen that the calculated load bearing capacity was 672 psi. As indicated in TABLE 1, this represents a 238% increase in capacity over that calculated for pure emulsion (199 psi) and is almost equal to that calculated for pure lignosulfonate (710 psi). If one assumed that the addition of lignosulfonate to emulsion would result in a proportional increase in load bearing capacity, then one would expect the load bearing capacity for Sample 7 to be 454.5 psi (viz. half way between 199 psi and 710 psi). However, as noted above, the actual calculated value was 672 psi—which represents an increase of about 48% over what one would expect if there was a simple proportionate relationship.

For a range of samples, the load bearing capacity actually exceeds that for either pure asphaltic emulsion or pure lignosulfonate. Indeed, a very high value (1032 psi) was calculated at a 95:5:50 volume ratio. However, despite this result at a high proportion of lignosulfonate, and despite the fact that lignosulfonate is less costly than asphaltic emulsion, the use of such a high proportion is not recommended. The mix of asphaltic emulsion and lignosulfonate becomes too water soluble and brittle, and a volume ratio any higher than 90:10:50 would likely be considered unsuitable for most practical applications.

The fact that the cost per kilogram of residue decreases with increasing lignosulfonate is of course not dependent on any physical property or characteristic of the invention. However, it does reveal an added practical benefit that can be realized as long as the cost of lignosulfonate is less than that of asphaltic emulsion.

Modifications to and variants of the present invention, including procedures for its application, may readily occur to those skilled in the art. The invention is not to be construed as limited to particular proposals described above, but is to be afforded its full scope as defined by the accompanying claims.

TABLE 1

DIFFERENT RATIOS OF ASPHALTIC EMULSION AND LIGNOSULFONATE

| Section | Sample: 1 | 2 | 3 | 4 | 5 | 6 | 7 |
|---|---|---|---|---|---|---|---|
| A. VOLUME PARTS | | | | | | | |
| Asphaltic Emulsion | 100 | 95 | 90 | 80 | 70 | 60 | 50 |
| Lignosulfonate | 0 | 5 | 10 | 20 | 30 | 40 | 50 |
| Water | 50 | 50 | 50 | 50 | 50 | 50 | 50 |
| B. RESIDUE % (BY WEIGHT) | | | | | | | |
| Solid Asphalt | 100 | 100 | 100 | 100 | 100 | 100 | 100 |
| Solid Lignosulfonate | 0 | 5.9 | 12.5 | 28.0 | 48.1 | 74.8 | 112.2 |
| C. MARSHALL LOAD (N) | 11692 | 12917 | 14030 | 19745 | 21887 | 21005 | 21379 |
| Marshall Load Increase (%) | 0 | 10.5 | 20 | 69.0 | 87.0 | 80.0 | 83.0 |
| D. CALCULATED LOAD BEARING CAPACITY (PSI) | 199 | 238 | 388 | 546 | 606 | 581 | 672 |
| Calculated Load Bearing Capacity Increase (%) | 0 | 19.0 | 95.0 | 174.0 | 205.0 | 192.0 | 238.0 |
| E. COST OF RESIDUE (c/lkg) | 49.07 | 47.81 | 46.57 | 44.14 | 41.76 | 39.43 | 37.16 |
| Cost of Decrease (%) | 0 | 2.6 | 5.1 | 10.0 | 14.9 | 19.7 | 24.3 |

| Section | Sample: 8 | 9 | 10 | 11 | 12 | 13 |
|---|---|---|---|---|---|---|

TABLE 1-continued

DIFFERENT RATIOS OF ASPHALTIC EMULSION AND LIGNOSULFONATE

| A. VOLUME PARTS | | | | | | |
|---|---|---|---|---|---|---|
| Asphaltic Emulsion | 40 | 30 | 20 | 10 | 5 | 0 |
| Lignosulfonate | 60 | 70 | 80 | 90 | 95 | 100 |
| Water | 50 | 50 | 50 | 50 | 50 | 50 |
| B. RESIDUE % (BY WEIGHT) | | | | | | |
| Solid Asphalt | 100 | 100 | 100 | 100 | 100 | — |
| Solid Lignosulfonate | 168.4 | 262 | 449 | 1010 | 2133 | — |
| C. MARSHALL LOAD (N) | 22715 | 23192 | 25236 | 24773 | 28474 | 28775 |
| Marshall Load Increase (%) | 94.0 | 98.0 | 116.0 | 112.0 | 144.0 | 146.0 |
| D. CALCULATED LOAD BEARING CAPACITY (PSI) | 823 | 723 | 914 | 897 | 1032 | 710 |
| Calculated Load Bearing Capacity Increase (%) | 314.0 | 263.0 | 359.0 | 350.0 | 419.0 | 257.0 |
| E. COST OF RESIDUE (c/lkg) | 34.95 | 32.78 | 30.66 | 28.59 | 27.57 | 26.56 |
| Cost of Decrease (%) | 28.8 | 33.2 | 37.5 | 41.7 | 43.8 | 45.9 |

NOTE:
Asphaltic Emulsion - 57% residue; cost c 27.97/l; density 1.00
Lignosulfonate - 50% residue; cost c 17.00/l; density 1.28

TABLE 2

AGGREGATE PROFILE

| Sieve Opening in Millimeters | Percent Of Aggegate Passing |
|---|---|
| 0.075 | 6 |
| 0.150 | 13 |
| 0.300 | 31 |
| 0.600 | 57 |
| 1.18 | 75 |
| 2.36 | 81 |
| 4.75 | 95 |
| 9.5 | 100 |

We claim:

1. An agent for stabilizing soil or aggregate, said agent being formed by mixing asphaltic emulsion, lignosulfonate and water, the volume ratio of lignosulfonate to asphaltic emulsion being in the range of 10:90 to 90:10.

2. A stabilizing agent as defined in claim 1 wherein, said lignosulfonate is selected from the group consisting of:
   (a) calcium lignosulfonate;
   (b) sodium lignosulfonate;
   (c) ammonium lignosulfonate.

3. A stabilizing agent as defined in claim 1 wherein, the volume ratio as between said emulsion, lignosulfonate and water is selected to avoid the occurrence of asphalt particle coagulation and floculation.

4. A stabilizing agent as defined in claim 3 wherein, said lignosulfonate is selected from the group consisting of:
   (a) calcium lignosulfonate;
   (b) sodium lignosulfonate;
   (c) ammonium lignosulfonate.

5. A stabilizing agent as defined in claim 3 formed by mixing a slow setting anionic asphaltic emulsion, calcium lignosulfonate and water in a volume ratio of about 1:1:1.

6. A stabilizing agent as defined in claim 5 wherein, said lignosulfonate is selected from the group consisting of:
   (a) calcium lignosulfonate;
   (b) sodium lignosulfonate;
   (c) ammonium lignosulfonate.

7. A soil or aggregate matrix stabilized by mixing a blend of asphaltic emulsion, lignosulfonate and water with said soil or aggregate, said blend being formed by mixing asphaltic emulsion, lignosulfonate and water, the volume ratio of lignosulfonate to asphaltic emulsion being in the range of 10:90 to 90:10.

8. A road comprising a soil or aggregate matrix as defined in claim 7.

9. A road comprising a soil or aggregate matrix as defined in claim 7, said matrix being stabilized by mixing a slow setting anionic asphaltic emulsion, calcium lignosulfonate and water with said soil or aggregate.

10. A soil or aggregate matrix as defined in claim 7 wherein, said lignosulfonate is selected from the group consisting of:
    (a) calcium lignosulfonate;
    (b) sodium lignosulfonate;
    (c) ammonium lignosulfonate.

11. A soil or aggregate matrix as defined in claim 7 wherein, the volume ratio as between such emulsion, lignosulfonate and water is, when mixed with said soil or aggregate, selected to avoid the occurrence of asphalt particle coagulation and floculation.

12. A soil or aggregate matrix as defined in claim 11 wherein, said lignosulfonate is selected from the group consisting of:
    (a) calcium lignosulfonate;
    (b) sodium lignosulfonate;
    (c) ammonium lignosulfonate.

13. A soil or aggregate matrix as defined in claim 11, said matrix being stabilized by mixing a slow setting anionic asphaltic emulsion, calcium lignosulfonate and water with said soil or aggregate, the volume ratio of said emulsion, lignosulfonate and water being about 1:1:1 at the time of such mixing.

14. A soil or aggregate matrix as defined in claim 13 wherein, said lignosulfonate is selected from the group consisting of:
    (a) calcium lignosulfonate;
    (b) sodium lignosulfonate;
    (c) ammonium lignosulfonate.

* * * * *